US007675864B2

(12) United States Patent
Wei

(10) Patent No.: US 7,675,864 B2
(45) Date of Patent: Mar. 9, 2010

(54) AUTOMATED PACKET SWITCH CARRIER HEALTH MONITORING PROCESS

(75) Inventor: Forrest B. Wei, Herndon, VA (US)

(73) Assignee: Verizon Services Corp., Arlington, VA (US)

( * ) Notice: Subject to any disclaimer, the term of this patent is extended or adjusted under 35 U.S.C. 154(b) by 369 days.

(21) Appl. No.: 11/560,954

(22) Filed: Nov. 17, 2006

(65) Prior Publication Data

US 2008/0043729 A1 Feb. 21, 2008

Related U.S. Application Data

(63) Continuation-in-part of application No. 11/460,008, filed on Jul. 26, 2006, now abandoned.

(51) Int. Cl.
*H04L 12/26* (2006.01)
(52) U.S. Cl. .................. 370/241.1; 370/353; 709/224
(58) Field of Classification Search ......... 370/217–222, 370/241, 241.1, 242–246, 250, 252, 352–355; 709/223–226
See application file for complete search history.

(56) References Cited

U.S. PATENT DOCUMENTS 6,230,006 B1 * 5/2001 Keenan et al. .............. 455/424

| 6,711,134 | B1 * | 3/2004 | Wichelman et al. | 370/241 |
|---|---|---|---|---|
| 7,099,942 | B1 * | 8/2006 | Wilson et al. | 709/224 |
| 7,304,958 | B2 * | 12/2007 | Nelson et al. | 370/249 |
| 7,369,509 | B2 * | 5/2008 | Lapeyre et al. | 370/252 |
| 2006/0007991 | A1 * | 1/2006 | Wang et al. | 375/224 |
| 2007/0258382 | A1 * | 11/2007 | Foll et al. | 370/252 |
| 2008/0013531 | A1 * | 1/2008 | Elliott et al. | 370/356 |

FOREIGN PATENT DOCUMENTS

EP 997638 A2 * 5/2000

OTHER PUBLICATIONS

Chiang, Man Wah et al., "Layered approach to designing system test interfaces," VLSI Test Symposium, 2003. May 2003. pp. 331-336.*
Jarwala, M. et al., "End-to-end test strategy for wireless systems," International Test Conference, 1995. Oct. 1995. pp. 940-946.*

* cited by examiner

*Primary Examiner*—Donald L Mills

(57) ABSTRACT

A system, method and computer program product are provided for determining the status of a packet-switched network by a computing device monitoring components that comprise the packet-switched network including a call-server, one or more gate-keepers, a TDM voice gateway, and one or more packet-switched routers. The computing device is configured to document failure location information associated with the packet-switched network and provide the failure information to a technical support organization.

15 Claims, 7 Drawing Sheets

| IP Phone Name | IP Phone Address | Operational Status | Gatekeeper | GK IP Address | Operational Status | TVG DS1 Port | Operational Status | IP Trunks | Operational Status |
|---|---|---|---|---|---|---|---|---|---|
| GRN_BR1 | 10.254.2.2 | Active | 1 | 192.168.78.2 | Active | | | GRN_HQ | IDLE |
| GRN_BR2 | 10.254.2.6 | Active | 1 | 192.168.78.2 | Active | | | GRN_HQ | IDLE |
| GRN_BR3 | 10.254.2.8 | Active | 1 | 192.168.78.2 | Active | | | GRN_HQ | IDLE |
| RED_BR1 | 10.254.2.10 | Disabled | 3 | 192.168.78.6 | Active | | | RED_HQ | IDLE |
| RED_BR2 | 10.254.2.12 | Active | 3 | 192.168.78.6 | Active | | | RED_HQ | IDLE |
| RED_BR3 | 10.254.2.14 | Disabled | 3 | 192.168.78.6 | Active | | | RED_HQ | IDLE |
| | | | 5 | 192.168.78.8 | Active | Laps800 Sts:0 Vt1dot51.1 | Active | DMS100 | IDLE |
| | | | 5 | 192.168.78.8 | Active | Laps800 Sts:0 Vt1dot51.2 | Active | DMS100 | IDLE |
| | | | 5 | 192.168.78.8 | Active | Laps800 Sts:0 Vt1dot51.3 | Active | DMS100 | IDLE |
| | | | 7 | 192.168.78.10 | Active | Laps800 Sts:0 Vt1dot52.1 | Disabled | 5ESS | Carrier Failure |
| | | | 7 | 192.168.78.10 | Active | Laps800 Sts:0 Vt1dot52.2 | Disabled | 5ESS | Carrier Failure |
| | | | 7 | 192.168.78.10 | Active | Laps800 Sts:0 Vt1dot52.3 | Disabled | 5ESS | Carrier Failure |

FIG. 6

AUTOMATED PACKET SWITCH CARRIER HEALTH MONITORING PROCESS

This patent application is a continuation-in-part of U.S. patent application Ser. No. 11/460,008, filed Jul. 26, 2006.

BACKGROUND INFORMATION

The public switched telephone network's (PSTN) primary service has been to provide Plain Old Telephone Service (POTS), which has been accomplished using circuit switching technology and techniques. Traditionally, calls were established using circuits having defined bandwidth and characteristics suitable for voice transfer. In contrast, the Internet is a packet switched network designed for data transfer in which bandwidth can be allocated as needed. The PSTN and the Internet are evolving, to an extent, so as to adopt certain aspects and capabilities of the other.

One service that is involved in the evolution of both networks is voice traffic. At a high level, the traditional circuit switch telephone network is migrating towards transporting voice using packet switching technology. This offers the prospect of increased efficiencies and utilization of common equipment for voice, data, and video traffic. Similarly, the Internet that was initially developed to handle data transfer between computers has been adapted to carry voice calls. Various approaches have been created to convey voice over the Internet ("VoIP"), and many of the capabilities present in the PSTN are being adapted to VoIP environments.

While the public networks and the Internet are evolving, so are private networks. Private networks are typically based on customer premises equipment (CPE) owned and operated by businesses. Private networks allow deployment of features that are not readily available from the public network providers often at a lower cost. The switching equipment is typically in the form of a private branch exchange (PBX) switch. Larger businesses (e.g., an "enterprise") may deploy multiple PBXs at different locations and interconnect them using tie-lines or tie-trunks. This allows calls to be routed within the private network to remote locations. The PBXs typically have interfaces to the public switched telephone network (PSTN) for handling calls to users "off" the private network.

Enterprises deploying PBXs have also discovered the benefits of integrating voice on IP based networks. However, doing so can complicate the interworking between the PSTN, IP networks, and other PBXs on the private networks. Typically, PBXs simply maintain their existing arrangement of interfaces and add a new interface for voice over IP networks. While this can offer the potential of saving money on certain types of calls, the overall complexity increases, including the process of monitoring a carrier's operational status. Therefore, it is desired that a process be defined to automatically test the operational status of IP trunks in an IP-based network.

BRIEF DESCRIPTION OF THE SEVERAL VIEWS OF THE DRAWING(S)

Reference will be made to the accompanying drawings, which are not necessarily drawn to scale, and wherein.

Figure 5:
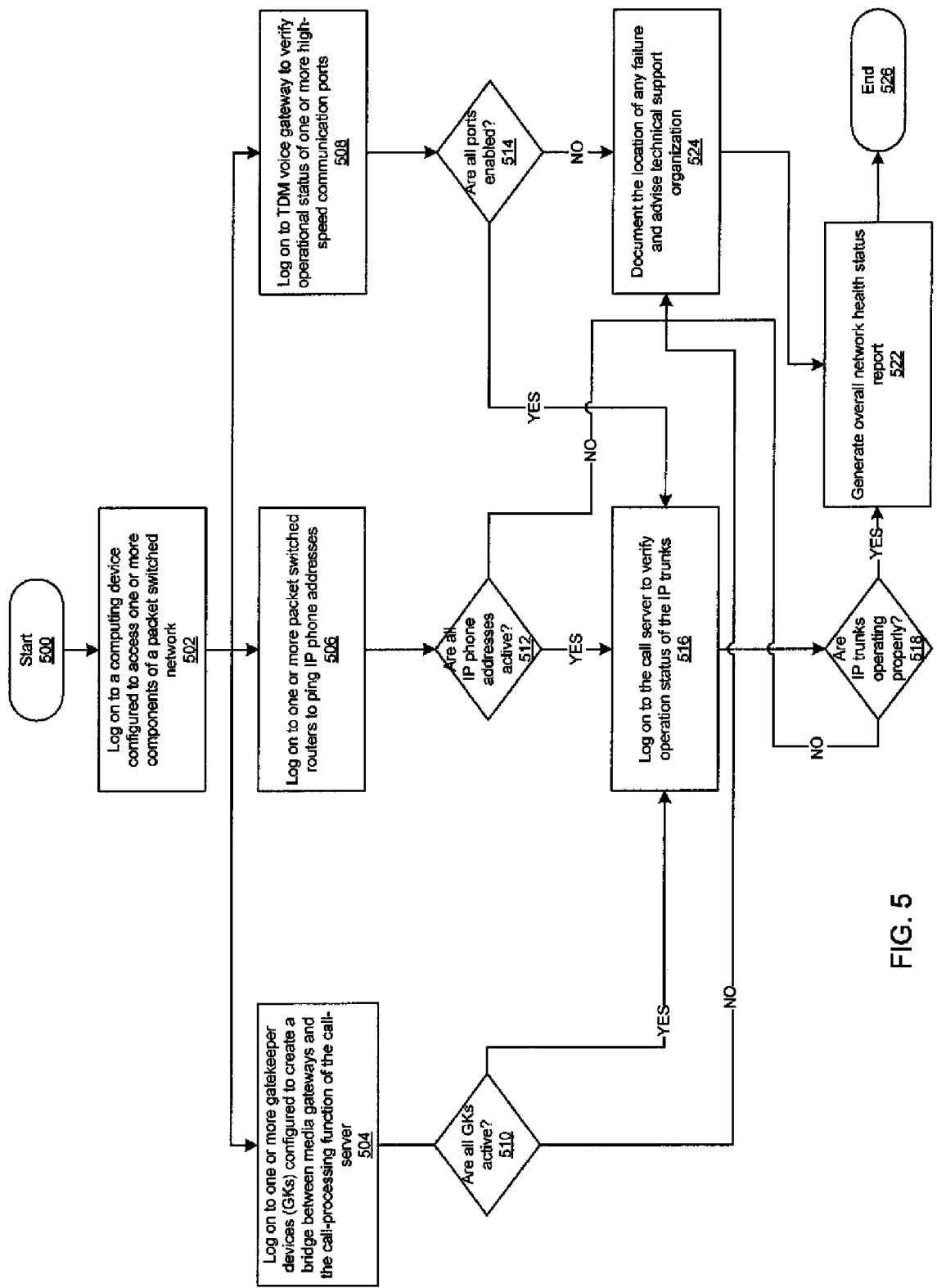

FIG. 5 is an exemplary flowchart for executing a process on the processor of the computing device to monitor the operational status of a packet-switched network employing VoIP in a preferred embodiment according to the present invention; and FIG. 6 is an exemplary diagnostic report message that describes the operational status of the IP phones, the gate keeper devices, the high-speed communication ports of the TVG, and the operational status of the IP trunks in a preferred embodiment according to the present invention.

DETAILED DESCRIPTION OF THE PREFERRED EMBODIMENTS

Preferred embodiments that may be implemented according to the present invention now will be described more fully with reference to the accompanying drawings, in which some, but not all embodiments of the invention are shown. Indeed, this invention may be embodied in many different forms and should not be construed as limited to the embodiments set forth herein. Rather, these embodiments are provided so that this disclosure will satisfy applicable legal requirements. Like numbers refer to like elements throughout.

As will be appreciated by one skilled in the art, the preferred embodiment may be implemented as a method, a data processing system, or a computer program product. Accordingly, the preferred embodiment may take the form of an entirely hardware embodiment, an entirely software embodiment, or an embodiment combining software and hardware aspects. Furthermore, implementations of the preferred embodiment may take the form of a computer program product on a computer-readable storage medium having computer-readable program instructions (e.g., computer software) embodied in the storage medium. More particularly, implementations of the preferred embodiments may take the form of web-implemented computer software. Any suitable computer-readable storage medium may be utilized including hard disks, CD-ROMs, optical storage devices, or magnetic storage devices.

The preferred embodiments according to the present invention are described below with reference to block diagrams and flowchart illustrations of methods, apparatuses (i.e., systems) and computer program products according to an embodiment of the invention. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Figure 1A:
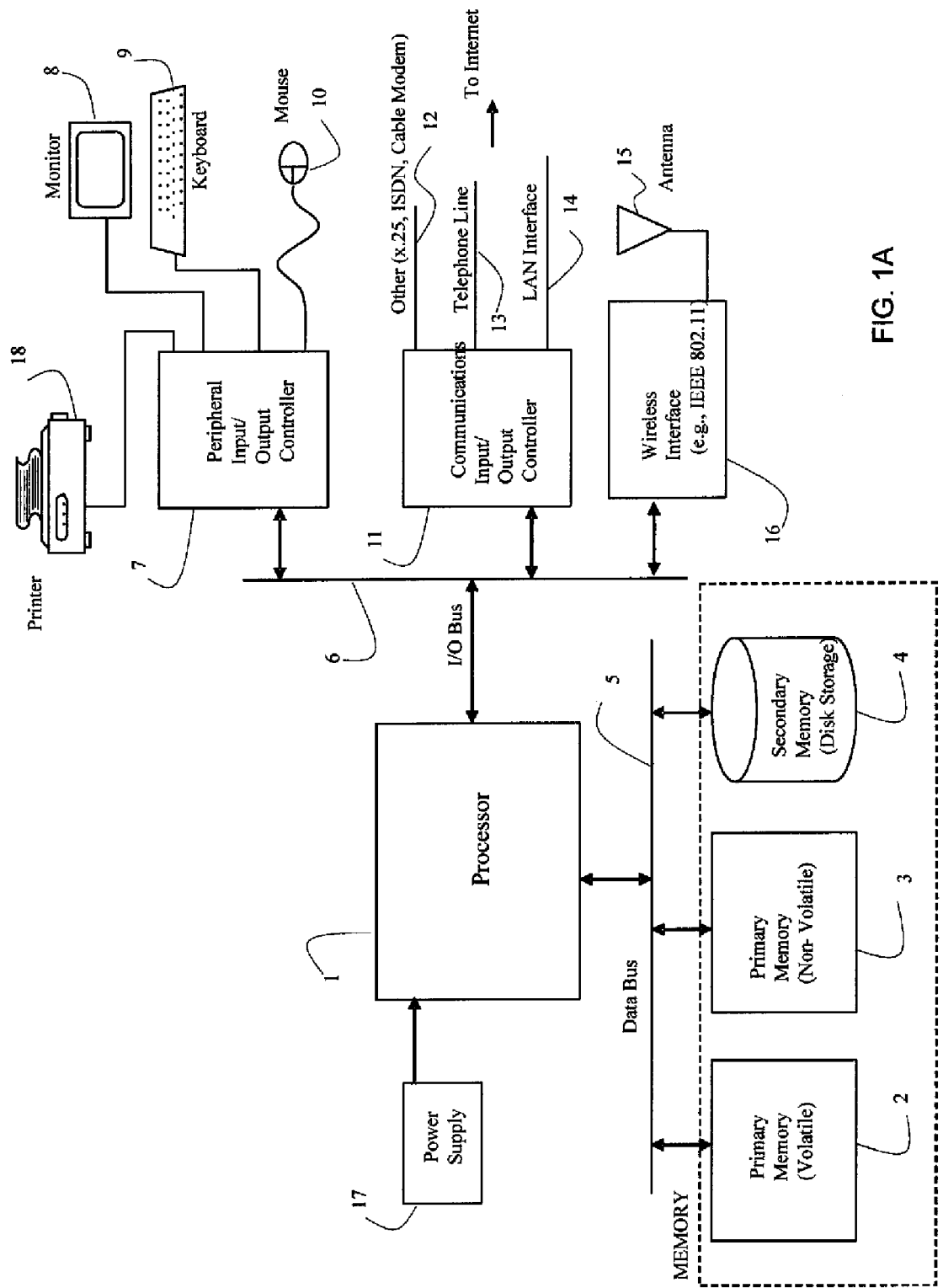
FIG. 1A is an illustration of one embodiment of a computing device that can be used to practice aspects of the present invention.

In the preferred embodiments referenced herein, a "computer" or "computing device" may be referenced. Such computer may be, for example, a mainframe, desktop, notebook or laptop, a hand held device such as a data acquisition and storage device, or it may be a processing device embodied within another apparatus such as, for example, a set top box for a television system or a wireless telephone. In some instances the computer may be a "dumb" terminal used to access data or processors over a network. Turning to FIG. 1A, one embodiment of a computing device is illustrated that can be used to practice aspects of the preferred embodiment. In FIG. 1A, a processor 1, such as a microprocessor, is used to execute software instructions for carrying out the defined steps. The processor receives power from a power supply 17 that also provides power to the other components as necessary. The processor 1 communicates using a data bus 5 that is typically 16 or 32 bits wide (e.g., in parallel). The data bus 5 is used to convey data and program instructions, typically, between the processor and memory. In the present embodiment, memory can be considered primary memory 2 that is RAM or other forms which retain the contents only during operation, or it may be non-volatile 3, such as ROM, EPROM, EEPROM, FLASH, or other types of memory that retain the memory contents at all times. The memory could also be secondary memory 4, such as disk storage, that stores large amount of data. In some embodiments, the disk storage may communicate with the processor using an I/O bus 6 instead or a dedicated bus (not shown). The secondary memory may be a floppy disk, hard disk, compact disk, DVD, or any other type of mass storage type known to those skilled in the computer arts.

The processor 1 also communicates with various peripherals or external devices using an I/O bus 6. In the present embodiment, a peripheral I/O controller 7 is used to provide standard interfaces, such as RS-232, RS-422, DIN, USB, or other interfaces as appropriate to interface various input/output devices. Typical input/output devices include local printers 18, a monitor 8, a keyboard 9, and a mouse 10 or other typical pointing devices (e.g., rollerball, trackpad, joystick, etc.).

The processor 1 typically also communicates using a communications I/O controller 11 with external communication networks, and may use a variety of interfaces such as data communication oriented protocols 12 such as X.25, ISDN, DSL, cable modems, etc. The communications controller 11 may also incorporate a modem (not shown) for interfacing and communicating with a standard telephone line 13. Finally, the communications I/O controller may incorporate an Ethernet interface 14 for communicating over a LAN. Any of these interfaces may be used to access a wide area network such as the Internet, intranets, LANs, or other data communication facilities.

Finally, the processor 1 may communicate with a wireless interface 16 that is operatively connected to an antenna 15 for communicating wirelessly with another device, using for example, one of the IEEE 802.11 protocols, 802.15.4 protocol, or standard 3G wireless telecommunications protocols, such as CDMA2000 1x EV-DO, GPRS, W-CDMA, or other protocol.

Figure 1B:
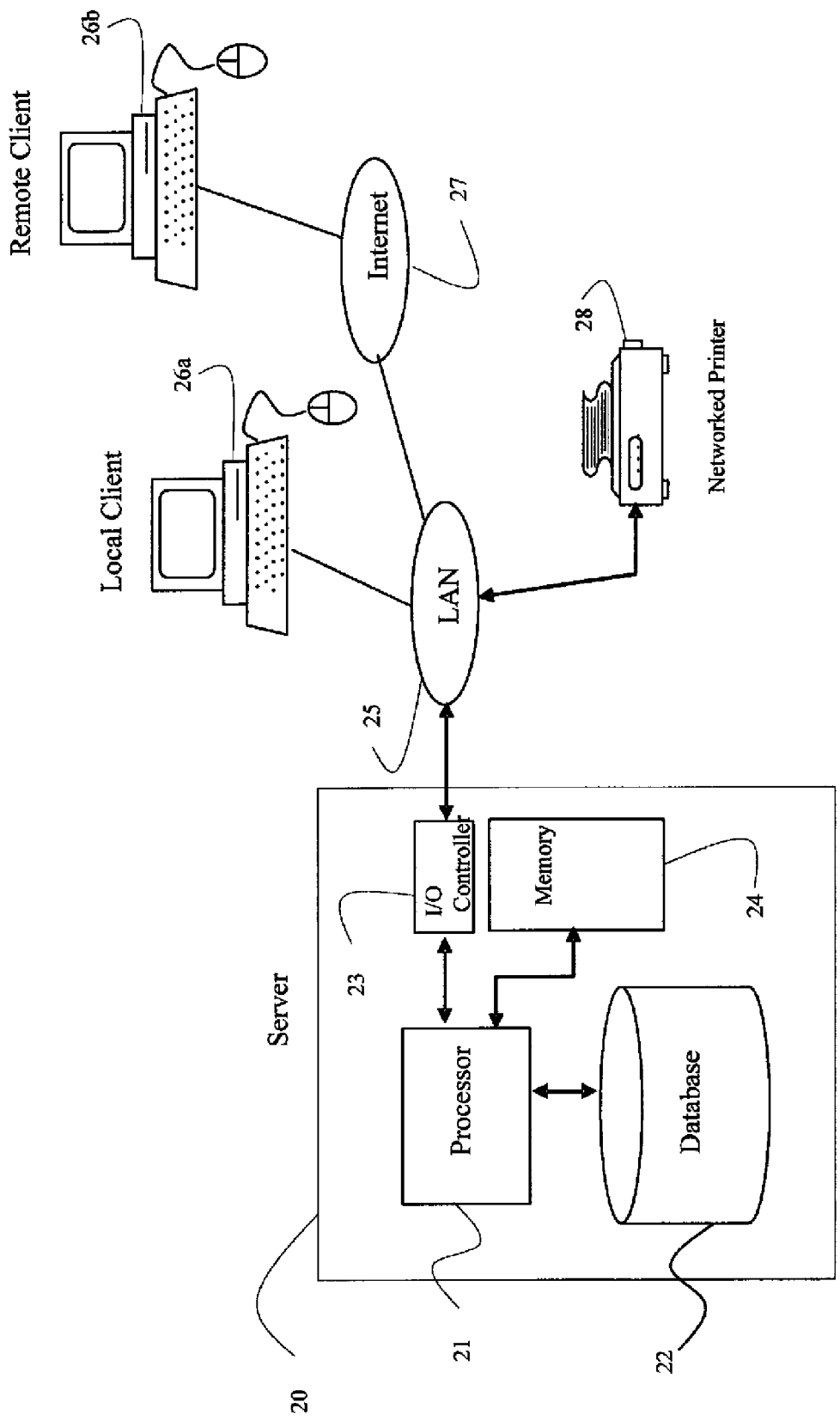
FIG. 1B is an embodiment of a processing system having a distributed communication and processing architecture that may be used to practice aspects of the present invention.

An alternative embodiment of a processing system that may be used is shown in FIG. 1B. In this embodiment, a distributed communication and processing architecture is shown involving a server 20 communicating with either a local client computer 26a or a remote client computer 26b. The server 20 typically comprises a processor 21 that communicates with a database 22, which can be viewed as a form of secondary memory, as well as primary memory 24. The processor also communicates with external devices using an I/O controller 23 that typically interfaces with a LAN 25. The LAN may provide local connectivity to a networked printer 28 and the local client computer 26a. These may be located in the same facility as the server, though not necessarily in the same room. Communication with remote devices typically is accomplished by routing data from the LAN 25 over a communications facility to a wide area network 27, such as the Internet. A remote client computer 26b may execute a web browser, so that the remote client 26b may interact with the server as required by transmitted data through the wide area network 27, over the LAN 25, and to the server 20.

Those skilled in the art of data networking will realize that many other alternatives and architectures are possible and can be used to practice the preferred embodiments. The embodiments illustrated in FIGS. 1A and 1B can be modified in different ways and be within the scope of the present invention as claimed.

Figure 2:
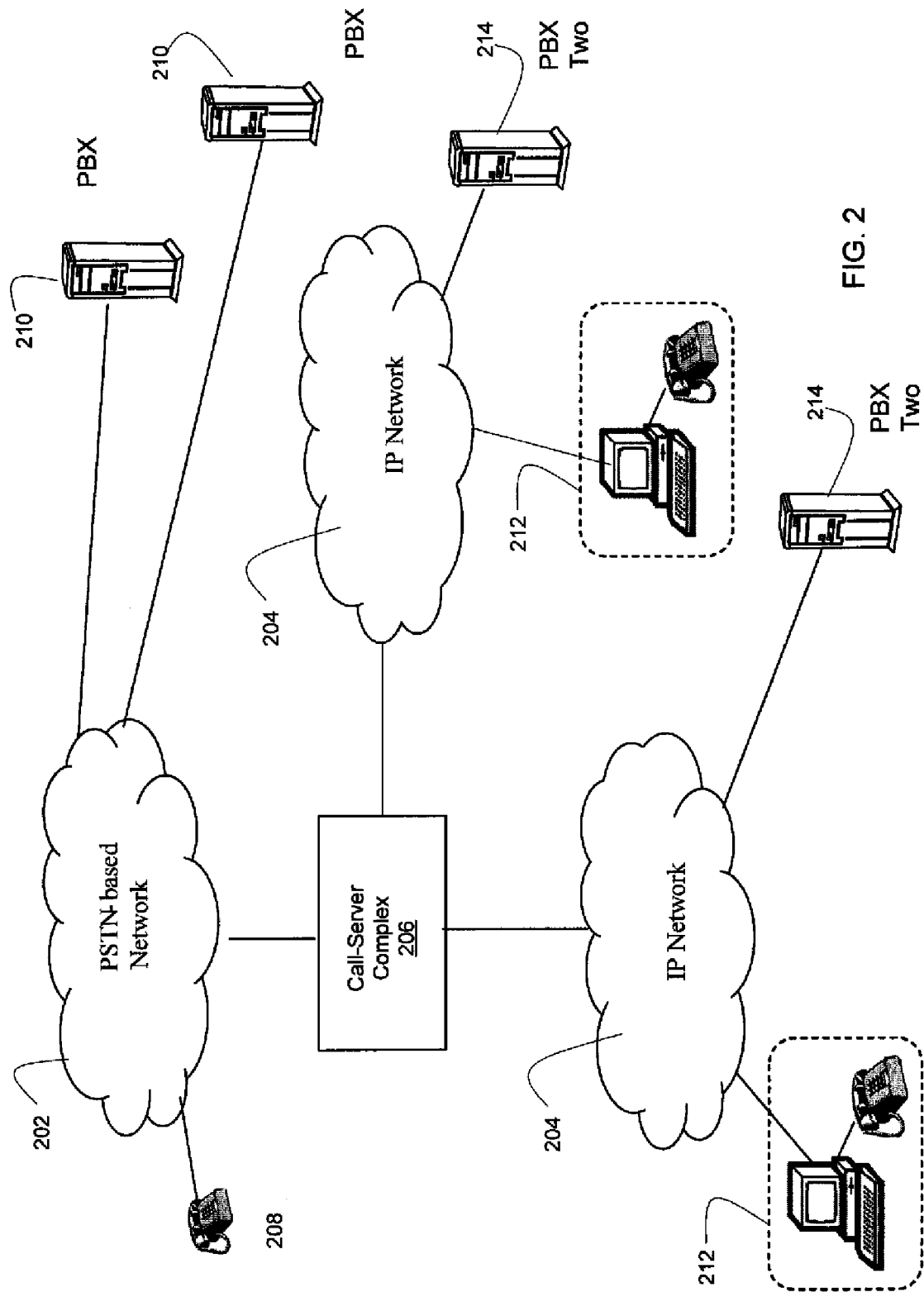
FIG. 2 is an illustration of an exemplary system of a PSTN network associated with one or more IP-based networks by a call-server complex.

FIG. 2 shows a PSTN network 202 associated with one or more IP-based networks 204 by a call-server complex 206. This arrangement may be used to allow PBXs to IP-enable their network by providing access and transport for IP on-network calls and off-network calls to the PSTN 202. The call-server complex 206 performs several functions, including call processing, billing collection and surveillance operations. Specifically, in FIG. 2, the PSTN network 202 is shown interfacing with end users such as traditional telephones 208 and PBXs 210. The one or more IP networks 204 may be, for example, SIP-based networks or H.323 networks, though an H.323 network is described in a preferred embodiment.

The PSTN based network 202 is well known, and allows direct connection for traditional voice telephones 208 and PBXs 210. Although these may use different interfaces to the PSTN (e.g., analog lines, ISDN interfaces, etc.), the PSTN seamlessly interworks the signaling and user traffic between the entities.

Another network carrying voice (and other forms of user traffic, such as video, multi-media, or data) is an H.323-based IP network 204. From a signaling perspective, the H.323-based IP network 204 is a development originating from the telephone industry (e.g., PBX manufacturers, telephone network providers, telephone equipment manufacturers, etc.). Specifically, H.323 was developed largely by adapting existing telephone signaling paradigms for establishment of voice and data calls over the Internet.

The H.323 standard is an umbrella standard; i.e., it comprises a whole family of standards for call establishment on an IP network. A significant aspect of the H.323 protocol family is that the signaling protocols are conveyed as higher level data to the lower three layers of an IP network. Specifically, the physical layer, the data link layer, and network layer (e.g., IP) convey the signaling messages using TCP. The call control signaling is typically conveyed by TCP/IP. The signaling comprising call control largely is found in H.225 (part of the protocol family) and focuses on basic call control procedures. (Another standard, H.245, involves multi-media calls.) The H.225 call control procedures are based on Q.931 ISDN signaling protocols. Similarly, the supplementary services protocols are based on Q.932 and other ISDN based procedures.

The calls or sessions established involve data transfer between two users and is transported through the lower layers of the IP network. The data is carried by the UDP (connectionless) service of the lower layers of the TCP/IP stack. This service provides a connectionless data transfer of audio and video data, which can be processed according to different audio codec standards or various video data processing standards.

The H.323-based network 204 of FIG. 2 can interwork with the PSTN 202, because the protocols and procedures are similar. Interworking components as found in the call-server complex 206 can be used to facilitate interworking signaling between the PSTN network 202 and the H.323-based network 204.

In FIG. 2, IP-enabled computing devices and telephones 212 are illustrated as one embodiment of customer equipment that may be able to interface with the IP network directly. Also depicted are PBXs, PBX Two 214, that may or may not require an interworking device (not shown) in order to use the IP network 204 to make or receive calls.

FIG. 2 illustrates the complexity that rapidly arises when a traditional communications service provider attempts to interwork with IP networks. Currently, PSTN networks are ubiquitous and convey the majority of voice traffic. Separate data networks (e.g., IP networks) co-exist for routing Internet Protocol packets and other data. In many cases, PSTN operators own and operate both type of networks side-by-side in the same service area. Even if PSTN operators do not own IP networks, they are, or will be, required to interwork with IP networks for carrying calls. As seen by FIG. 2, interworking voice traffic (as other types of traffic) is rapidly becoming complicated. Each new interface configuration further complicates interworking. Specifically, adding a new interface configuration requires the new interface to interwork not only with the PSTN, but with IP-based networks. Even if standards exist for defining the new approach for interworking, the proliferation of new required interworking devices increases the complexity of diagnostics and trouble-shooting such a system above that of legacy PSTN systems.

Figure 3:
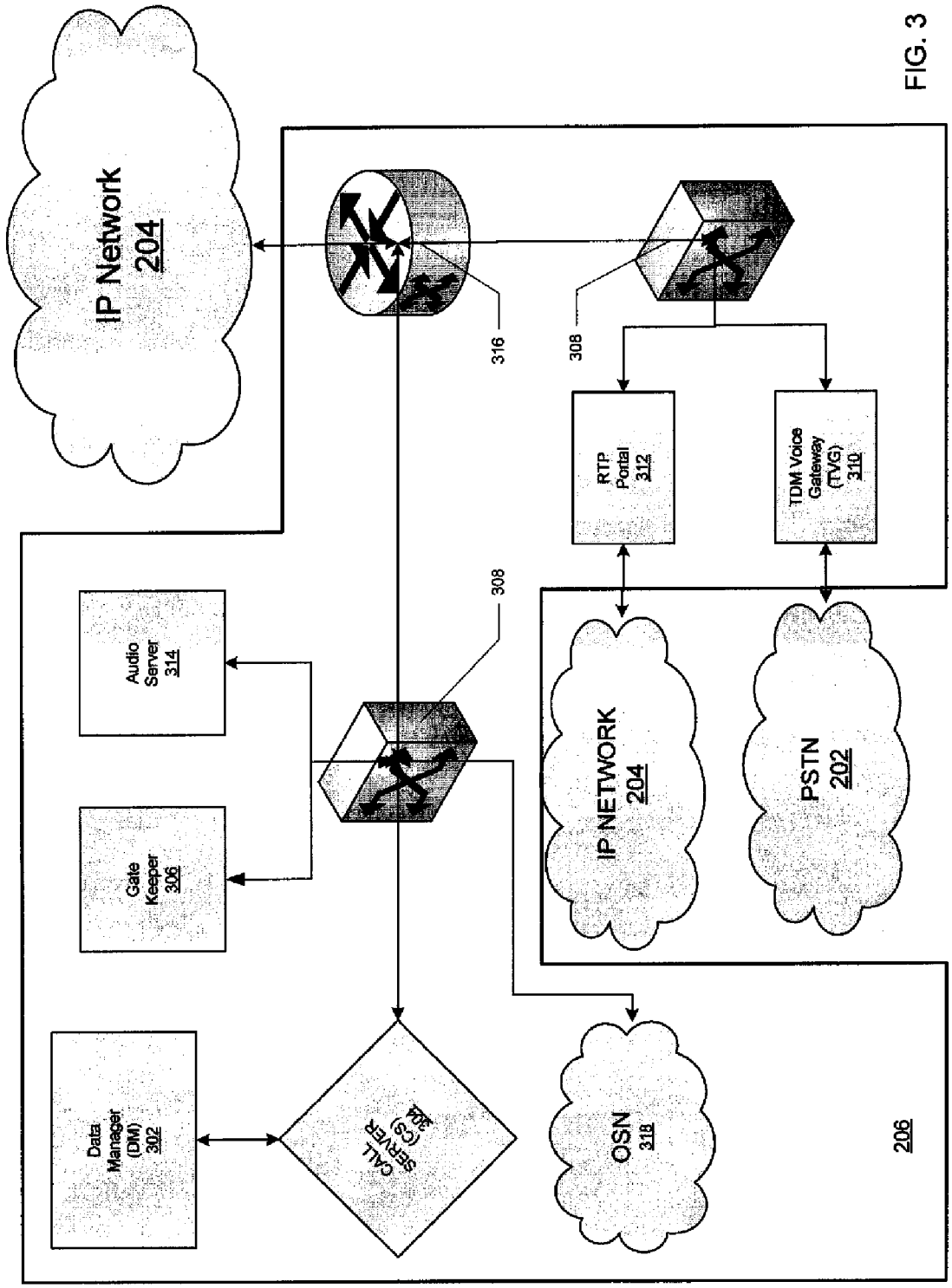
FIG. 3 is an exemplary call-server complex showing the elements that comprise such a call-server complex in a preferred embodiment according to the present invention.

FIG. 3 is an exemplary call-server complex 206 showing the elements that comprise such a call-server complex. The call-server complex 206 provides call-processing, billing collection and surveillance functionality in a VoIP/packet switched environment. The major network elements within the call server complex include a data manager (DM) 302, which provides operations, administration, maintenance, and provisioning (OAM&P) functionality for a call server 304. The call server 304 is a call processing component that controls the signaling gateway and the media gateway functionality. In one embodiment the call server 304 may be a Nortel CS2K Carrier Softswitch as is available from Nortel Networks of Brampton, Ontario (Canada), though other call servers are contemplated within the scope of this invention. The gate keeper (GK) 306 of FIG. 3 is a protocol converter that creates a bridge between media gateways and the call processing function provided by the call server 304. The call-server complex 206 of FIG. 3 includes one or more packet switch routers (PSRs) 308. These are routing devices for the call server local area network (CSLAN) that allows the components of the call-server complex 306 to interface with one another and with other networks and devices. The PSRs 308 support routing of call processing, signaling and management messages between the call server 306 and the other components of the call-server complex 206. PSRs route voice and media data to one or more IP-enabled devices 212, PBX Twos 214 or other devices having IP addresses that are associated with an IP network 204. The time division multiplexer voice gateway (TVG) 310 provides a media gateway to the PSTN 202, while the real-time transport protocol media portal (RTP Portal) 312 provides a communication bridge between different IP networks 204. The call-server complex is further comprised of an audio server (AS) 314, which is an application server that provides audio announcements, an Internet router 316, which may be a Juniper M20 as available from Juniper Networks, Inc., and provides routing between IP networks 204. Also shown in FIG. 3 is an operation security network (OSN) 318 that provides security, surveillance, provisioning and billing functions for the call center complex 206.

As described above, the call-server complex 206 of FIG. 3 allows PBX users to IP enable their networks, replaces traditional switched and dedicated long distance services with packet-switched and VoIP technology, and provides access and transport for IP on-network calls and off-network calls to the PSTN 202.

In a conventional PSTN 202, trunks are used in a connection-mode system where a connection is made from one party to a remote party. A connection-mode system is analogous to a pipe where data or information enters at one end and exits at the other. In a PSTN system, a carrier's operational status can be determined by simply issuing a single command from, for example, the TVG 310 in order to check whether the carrier trunks are operating or not. In packet switching networks, however, data is "packetized" and each packet of information is individually addressed. Because each packet is separately addressed, each packet may take a separate route to its destination, depending upon factors such as network configuration, congestion, etc. Therefore, while IP trunks are comprised of physical devices such as wires, cables, antenna, switches, etc., a carrier's trunks are also "virtual" in the sense that the route taken from a sending device to a receiving device may only exist for one, or a few, packets. Determining the operational status of the trunks in an IP network includes accessing several network elements in a designated sequence and taking actions dependant upon the status returned from the various accessed network elements.

Figure 4:
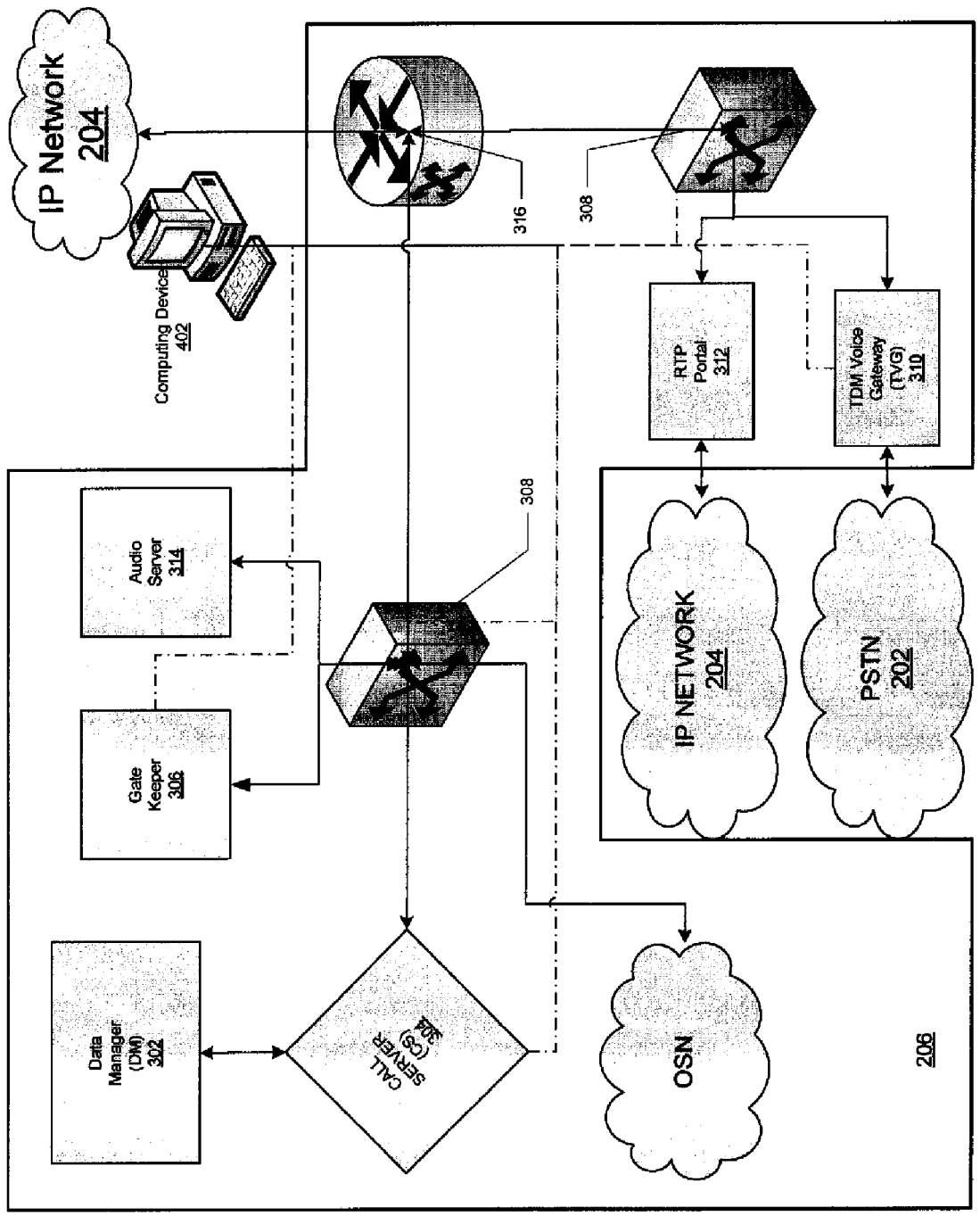
FIG. 4 is an exemplary call-server complex showing the elements that comprise such a call-server complex and a system for monitoring the operational status of the packet switch network in a preferred embodiment according to the present invention.

FIG. 4 is an exemplary call-server complex 206 showing the elements that comprise such a call-server complex and a system for monitoring the operational status of the packet switched network. A computing device 402 is connected via a network to the call server 304, each PSR 308, the gate keeper device (GK) 306, and the TVG 310. The computing device 402 may be one as is shown in FIGS. 1A and 1B, above, and as described in regard to those figures. The network may be wired, wireless, optical, or combinations thereof and it may be separate from any other network that comprises the call-server complex 206, or it may be a part of a network of the call-server complex 206 that performs other functions. In any event, the computing device 402 is able to at least access the above-identified components of the call-server complex 206 in a defined sequence and to interchange information with these components. Based on the information received from the components, the computing device 402 may undertake various actions according to an algorithm executing on the processor of the computing device 402.

FIG. 5 is an exemplary flowchart for executing a exemplary process on the processor of the computing device to monitor the operational status of a packet-switched network employing VoIP in a preferred embodiment. The process begins at step 500. At step 502 a user logs on to a computing device 402 that is configured to access components of a packet switched network including PSRs 308, the call server 304, the GK 306, and the TDM voice gateway 310. Security for the network and devices is facilitated through the use of a logon process for the computing device 402. At step 504, the computing device accesses and logs on to the one or more gate keeper devices 306 to verify their operational status. Connectivity is established through telnet sessions using TCP/IP protocol, as is known in the art, though it is contemplated within the scope of this invention that other means of connectivity such as simple network management protocol (SNMP) may be used. The computing device issues a status command to the gate keeper devices 306, which is a one line command to look for status of the device. The gate keeper device returns a self-diagnostic status that indicates whether the gate keeper is active or disabled. The status is returned to the computing device via a telnet session in a text format. At step 506, the computing device accesses and logs on to the one or more PSRs 308 to verify the operational status of IP addresses associated with IP-enabled devices. For example, the computing device may cause the PSRs 308 to issue "ping" messages to the IP addresses associated with the IP-enabled devices. "Ping" is short for "packet Internet groper," which is a utility to determine whether a specific IP address is accessible. It works by sending a packet to the specified address and waiting for a reply. Ping is used primarily to troubleshoot Internet connections. There are many freeware and shareware PING utilities available for computing devices. Other means of determining the status of IP-enabled devices include traceroute commands and SNMP queries, depending on the configuration of the PSRs 308. Traceroute is a TCP/IP utility that allows a user to determine if two computing devices are communicating successfully with each other. At step 508, the computing device accesses and logs on to the TDM voice gateway (TVG) 310 to verify the operational status of its high-speed digital communication ports (e.g., DS1, OC-3, etc.). Similar to the means for accessing the gate keepers as described above, a telnet session is used to access, log on, and request the status of the TVG 310, though other means such as SNMP are contemplated within the scope of this invention. A self-diagnostic text status is returned from the TVG 10 using telnet or some other suitable protocol indicating whether the TVG port(s) are active/disabled.

Steps 510, 512 and 514 each determine whether the one or more gate keeper devices are actively functioning, whether the IP addresses associated with the IP-enabled devices are actively functioning and whether each of the high-speed communication ports of the TVG are enabled, respectively. This is accomplished by a telnet session between the computing device and the gate keeper devices, the PSRs, and the TVG. The computing device issues a request for a status from each device which in turn executes a self-diagnostic and responds with a text status (active/disabled). If the GKs are actively functioning, the IP addresses are actively functioning and the high-speed communication ports of the TVG are enabled, then the process goes to step 516. At step 516, the computing device accesses and logs on to the call server 304 via a telnet session. The call server 304, in turn, verifies the operational status of the IP trunks by determining whether the call server is capable of communicating with other devises on the IP network such as routers, switches, etc. At step 518, it is determined whether the IP trunks are operating properly. If, at step 518, the physical IP trunks are operating properly, then the process goes to step 520 where an overall network health status report is created by the computing device.

Returning to steps 510, 512, 514, and 518, if at step 510 any of the GKs are not active, or at step 512 if any of the IP addresses are not actively functioning, or at step 514 any of the high-speed communication ports are not enabled, or any combination of these issues, or at step 518 any of the IP trunks are not operating properly, then the process goes to step 524 where the computing device documents the location of any failure associated with steps 510, 512, 514 and 518 and forwards an electronic message to one or more technical support organizations according to the nature of the failure(s). If the IP addresses are not actively functioning, them the support organization generally checks the IP phones first, then the routers, then other network components. If the high-speed communications ports are not functioning properly, then the support organization is directed to look at the TVG for the source of the problem. If the IP trunks are not functioning properly, then the support organization will generally first look to the call server. FIG. 6 is an exemplary diagnostic report message that describes the operational status of the IP phones, the gate keeper devices, the high-speed communication ports of the TVG, and the operational status of the IP trunks. From step 524, the process goes to step 522 where the overall network health status report is generated by the computing device (including reporting an failures and the location of such failures). The process of FIG. 5 ends at step 526.

MODIFICATIONS AND ALTERNATIVE EMBODIMENTS

Many modifications and other embodiments will come to mind in light of the teachings presented in the foregoing descriptions of the preferred embodiments. For example, while the above described process may be executed manually, or it may be set up to run on an automatic basis after a certain period of time of when certain events occur. Data returned from the process may be archived and used for diagnostic reporting, maintenance and upgrades, or other operational and managerial reporting functions. Furthermore, while the preferred embodiment is described using telnet sessions, it is also contemplated that the embodiments of the invention can be web-enabled and/or use other protocols such as SNMP, etc. Accordingly, it should be understood that the invention is not to be limited to the specific embodiments described herein, but rather to the appended claims, and that modifications and other embodiments are intended to be included within the scope of the appended claims. Although specific terms are employed herein, they are used in an inclusively descriptive sense only and not for purposes of limitation.

That which is claimed:
1. A system comprising:
  a packet-switched network using Internet Protocol (IP) communications and comprised of at least one call-server, one or more gate-keepers, at least one TDM voice gateway, and one or more packet-switched routers;
  a computing device in communication with said at least one call-server, one or more gate-keepers, the at least one TDM voice gateway, and one or more packet-switched routers, wherein said computing device is configured to access said one or more gate-keepers to determine whether said one or more gate keepers are active, access said one or more packet-switched routers to determine whether IP addresses associated with IP-enabled devices and accessible by said one or more packet-switched routers are active, and access said at least one TDM voice gateway to determine whether high-speed communication ports associated with said at least one TDM voice gateway are enabled.

2. The system of claim 1, wherein said computing device is further configured to access said call-server device to verify the status of IP trunks associated with said packet-switched network.

3. The system of claim 1, wherein said computing device is further configured to document failure location information comprised of a location of a failure associated with said packet-switched network when at least one of said one or more gatekeepers are not active, at least one of said IP addresses are not active, at least one of said high-speed communication ports associated with said at least one TDM voice gateway are not enabled, or at least one of said IP trunks associated with said packet-switched network are not operational.

4. The system of claim 3, wherein said failure location information is electronically forwarded to a technical support organization.

5. A method comprised of:
providing a packet-switched network using Internet Protocol (IP) communications and comprised of at least one call-server, one or more gate-keepers, at least one TDM voice gateway, and one or more packet-switched routers;
providing a computing device in communication with said at least one call-server, one or more gate-keepers, said at least one TDM voice gateway, and one or more packet-switched routers;
accessing said one or more gate-keepers with said computing device to determine whether said one or more gate keepers are active;
accessing said one or more packet-switched routers to determine whether IP addresses associated with IP-enabled devices and accessible to said one or more packet-switched routers are active; and
accessing said at least one TDM voice gateway to determine whether high-speed communication ports associated with said at least one TDM voice gateway are enabled.

6. The method of claim 5, further comprising accessing said call-server device and verifying the status of all IP trunks associated with said packet-switched network with said computing device.

7. The method of claim 5, further comprising documenting failure location information with said computing device wherein said failure location information is comprised of a location of a failure associated with said packet-switched network when at least one said one or more gatekeepers are not active, at least one of said IP addresses are not active, at least one of said high-speed communication ports associated with said TDM voice gateway are not enabled, or at least one of said IP trunks associated with said packet-switched network are not operational.

8. The method of claim 7, further comprising said computing device electronically forwarding said failure location information to a technical support organization.

9. A computer program product comprising:
a memory having computer readable code embodied therein, for execution by a computing device having at least a processor and a memory, said code comprising:
a) a first executable code portion configured to access one or more gate-keepers of a packet-switched network to determine whether said one or more gate keepers are active;
b) a second executable code portion configured to access one or more packet-switched routers of the packet-switched network to determine whether IP addresses associated with IP-enabled devices accessible by said one or more packet-switched routers are active;
c) a third executable code portion configured to access a TDM voice gateway of the packet-switched network to determine whether high-speed communication ports associated with said TDM voice gateway are enabled; and
d) a fourth executable code portion configured to access a call-server device of the packet-switched network to verify the status of IP trunks associated with said packet-switched network.

10. The computer program product of claim 9, further comprising a fifth executable code portion configured to document failure location information wherein said failure location information is comprised of a location of a failure associated with said packet-switched network when at least one of said one or more gatekeepers are not active, at least one of said IP addresses are not active, at least one of said high-speed communication ports associated with said TDM voice gateway are not enabled, or at least one of said IP trunks associated with said packet-switched network are not operational.

11. The computer program product of claim 10, further comprising a sixth executable code portion configured to electronically forward said failure location information to a technical support organization.

12. The computer program product of claim 9, wherein the fourth executable code portion is further configured to access the call server device when said one or more gatekeepers are active, said IP addresses are active, and said high-speed communication ports associated with said TDM voice gateway are enabled.

13. The system of claim 1, wherein access said one or more gate-keepers to determine whether said one or more gate keepers are active is based at least in part on a self-diagnostic text status of said one or more gate keepers.

14. The system of claim 1, wherein access said one or more packet-switched routers to determine whether IP addresses associated with IP-enabled devices and accessible by said one or more packet-switched routers are active comprises forwarding one or more packet Internet grouper (PING) messages to said IP addresses associated IP-enabled devices.

15. The system of claim 1, wherein access said at least one TDM voice gateway to determine whether high-speed communication ports associated with said at least one TDM voice gateway are enabled is based at least in part on a self-diagnostic text status of said at least one TDM voice gateway.

* * * * *